(12) United States Patent
Zheng

(10) Patent No.: US 8,261,442 B2
(45) Date of Patent: Sep. 11, 2012

(54) METHOD FOR SPLICING A BEND-OPTIMIZED OPTICAL FIBER

(75) Inventor: Wenxin Zheng, Ellicott City, MD (US)

(73) Assignee: AFL Telecommunications LLC, Spartanburg, SC (US)

( * ) Notice: Subject to any disclaimer, the term of this patent is extended or adjusted under 35 U.S.C. 154(b) by 509 days.

(21) Appl. No.: 12/526,894

(22) PCT Filed: Feb. 24, 2009

(86) PCT No.: PCT/US2009/034946
§ 371 (c)(1),
(2), (4) Date: Aug. 12, 2009

(87) PCT Pub. No.: WO2009/108612
PCT Pub. Date: Sep. 3, 2009

(65) Prior Publication Data
US 2011/0138598 A1    Jun. 16, 2011

Related U.S. Application Data

(60) Provisional application No. 61/031,070, filed on Feb. 25, 2008.

(51) Int. Cl.
*H01R 43/00* (2006.01)

(52) U.S. Cl. ......................................................... 29/868
(58) Field of Classification Search .................... 29/868, 29/419.1, 428; 385/95–99, 43, 128; 205/664, 205/674; 219/121.13; 65/501
See application file for complete search history.

(56) References Cited

U.S. PATENT DOCUMENTS

| | | | |
|---|---|---|---|
| 5,849,173 A | 12/1998 | Chandross et al. | |
| 6,866,429 B2 | 3/2005 | Wang et al. | |
| 2003/0016922 A1 | 1/2003 | DeMartino et al. | |
| 2005/0117856 A1 | 6/2005 | Huang et al. | |
| 2005/0232544 A1 | 10/2005 | Blumberg | |

*Primary Examiner* — John C Hong
(74) *Attorney, Agent, or Firm* — Sughrue Mion, PLLC

(57) ABSTRACT

A method of splicing a bend-optimized optical fiber in which a mesh of nanometer-scale pockets is formed in the cladding of the fiber is provided. The method may include cleaving the fiber; heating a section of the fiber at a distance from an end of the fiber; allowing the fiber to cool; transmitting light through the fiber; and splicing the fiber by analyzing an image of the fiber. Alternatively, the method may include heating a section of the fiber; allowing the fiber to cool; cleaving the fiber through the section of the fiber that was heated; transmitting light through the fiber; and splicing the fiber by analyzing an image of the fiber.

7 Claims, 4 Drawing Sheets

METHOD FOR SPLICING A BEND-OPTIMIZED OPTICAL FIBER

CROSS-REFERENCE TO RELATED PATENT APPLICATION

This application claims the benefit of U.S. Provisional Application No. 61/031,070, filed on Feb. 25, 2008 in the United States Patent and Trademark Office, the disclosure of which is incorporated by reference in its entirety.

BACKGROUND OF THE INVENTION

1. Field of the Invention

Methods consistent with the present invention relate to splicing a bend-optimized optical fiber, and more particularly, to heating a bend-optimized fiber before splicing the fiber by analyzing a cold image of the fiber.

2. Description of the Related Art

A related art bend-optimized optical fiber includes a core that is surrounded by a cladding. A mesh of nanometer-scale pockets is infused in the cladding to serve as a barrier that guides light back into the core when the fiber is bent with a very small bending radius, such as 1 cm. This bend-optimized optical fiber solves historic technical challenges related to installing fiber-to-the-home (FTTH) networks in high-rise apartment buildings and condominium complexes. The bend-optimized optical fiber prevents signal loss when bent around corners and routed through a building, enabling telecommunications carriers to install optical fiber cable into these complex environments and provide their customers with the near-infinite bandwidth benefits of a true FTTH solution.

In order to connect two standard optical fibers with each other, the end of each fiber may be heated, so that the fiber ends melt together and form one continuous waveguide. For splicing single mode optical fibers with a large core-to-cladding concentricity error, it is important to use a core alignment method to reduce the splice loss. In a core alignment method, the cores of the fibers are aligned with each other before the fiber ends are melted.

There are several known methods for performing this core alignment before fusion splicing the fibers. For example, many automatic fusion splicers use an image profile alignment system (PAS) that is based on cold fiber image analysis. In the PAS method, either the core or the cladding can be aligned to minimize the splice loss. The PAS method typically achieves a fusion splice loss of approximately 0.03 dB for eccentric fibers.

Another core alignment method is a light injection and detection system (LIDS), in which light is injected into one fiber and detected in the other fiber to be spliced. In addition, active light intensity feedback has been used as a core alignment method. This method uses measurement equipment, such as power meters and optical time domain reflectometers (OTDRs), to align the cores.

Another core alignment method is based on warm splice imaging, in which a fiber is briefly heated to cause the fiber to emit light, and an image of the light emitted from an end of the fiber is recorded. As described in WO 2008/055957, this warm splice imaging method has been used to align the cores of the bend-optimized fibers described above. In the warm splice imaging method, the holes within the cladding are collapsed during the short heating period, which appears to prevent the holes from disturbing the emission of light from the fiber.

The nanometer-scale pockets in the cladding of the bend-optimized fibers render the fiber core invisible during alignment with the PAS method. This makes it impossible to use the PAS method to splice a bend-optimized optical fiber. However, as discussed above, the PAS method can advantageously achieve a fusion splice loss of about 0.03 dB Therefore, a method is needed to enable core alignment of bend-optimized fibers with the PAS method.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a method of splicing a bend-optimized optical fiber in which a mesh of nanometer-scale pockets is formed in the cladding of the fiber.

According to an aspect of the present invention, there is provided a method of splicing a bend-optimized optical fiber, the method including cleaving the fiber; heating a section of the fiber at a distance from an end of the fiber; allowing the fiber to cool; transmitting light through the fiber; and splicing the fiber by analyzing an image of the fiber. The distance from the end of the fiber may be at least 200 μm. The fiber may be heated by an arc discharge with a current between about 11 mamp and about 13 mamp.

According to another aspect of the present invention, there is provided a method of splicing a bend-optimized optical fiber, the method including heating a section of the fiber; allowing the fiber to cool; cleaving the fiber through the section of the fiber that was heated; transmitting light through the fiber; and splicing the fiber by analyzing an image of the fiber. The fiber may be heated by an arc discharge with a current between about 11 mamp and about 13 mamp.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
FIG. 1 is an image of a bend-optimized fiber that is stripped, cleaved, and placed off-center in a splicer according to an exemplary embodiment of the present invention.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. However, the invention may be embodied in many different forms, and should not be construed as being limited to the exemplary embodiments set forth herein. In the drawings, like reference numerals denote like elements, and the thicknesses of layers and regions may be exaggerated for clarity and convenience.

According to an exemplary embodiment of the present invention, a core alignment method is provided in which a bend-optimized optical fiber is heated to collapse the mesh of nanometer-scale pockets in the cladding of the fiber, and the cores of two fibers are aligned by using the PAS method. FIG. 1 shows an image of a bend-optimized optical fiber that is stripped, cleaved, and placed off-center in a splicer. An arc discharge is then applied to the fiber. The power of this arc is much weaker than a fusion splicing arc, but may be twice as strong as an ordinary cleaning arc. For example, a 20-bit arc may be applied for 0.5 seconds. The 20-bit arc has a current between about 11 mamp and about 13 mamp.

Figure 2:
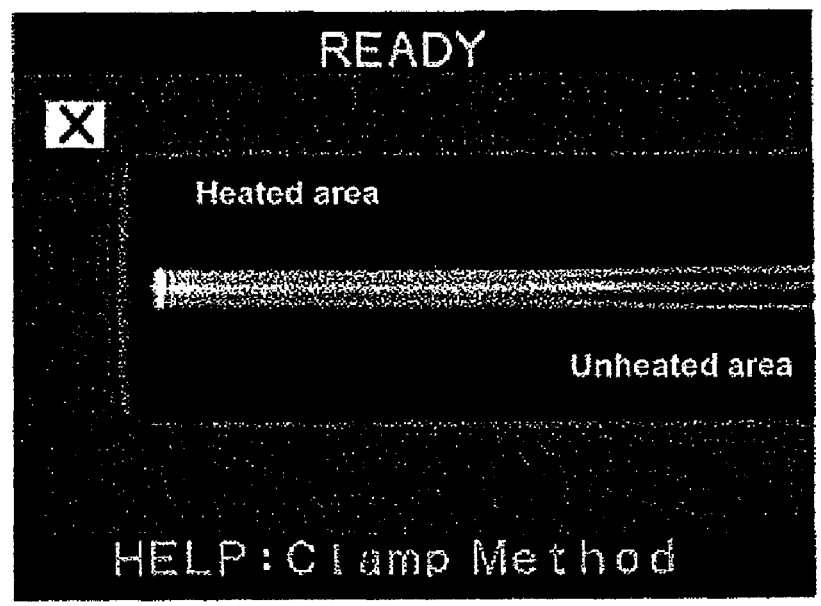
FIG. 2 is an image of the bend-optimized fiber of FIG. 1 after being heated by an arc discharge at a distance from the fiber end.
Figure 3:
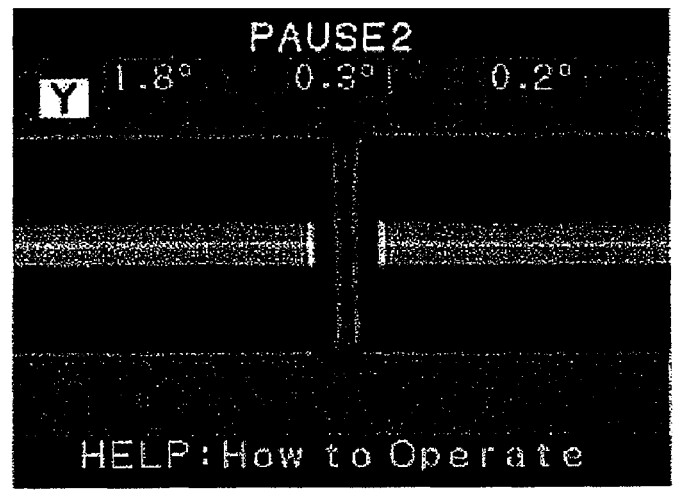
FIG. 3 is an image of two bend-optimized fibers after being heated by an arc discharge at a distance from each fiber end.
Figure 4:
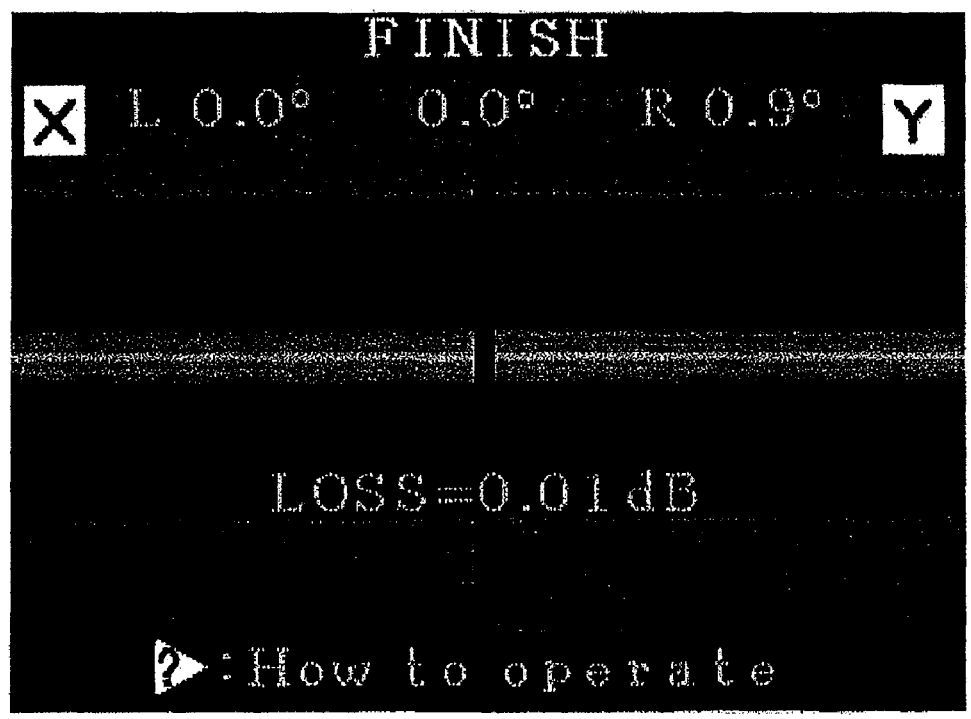
FIG. 4 is an image of the two bend-optimized fibers of FIG. 3 after being heated by an arc discharge and spliced together.

In order to protect the sharp corners and flat surface of the fiber end achieved by the cleaving, the arc discharge is applied to the fiber at a distance from the fiber end. For example, the arc discharge may be applied at a distance of at least 200 µm from the fiber end. The arc discharge treatment causes the mesh of nanometer-scale pockets in the fiber cladding to collapse and melt together with the cladding material. As shown in FIG. 2, the fiber core then becomes visible in the image. After the fiber cools, the core is ready to be aligned with the cold fiber image analysis of the PAS method, in which light is transmitted through the fiber and an image of the fiber is analyzed. FIG. 3 shows two bend-optimized optical fibers that have been treated with the arc discharge as described above. FIG. 4 shows these fibers after being treated with the arc discharge and spliced together with the PAS method. These figures illustrate that the bend-optimized optical fibers treated with the arc discharge are well suited for the traditional core alignment and fusion splice with the PAS method.

Figure 5:
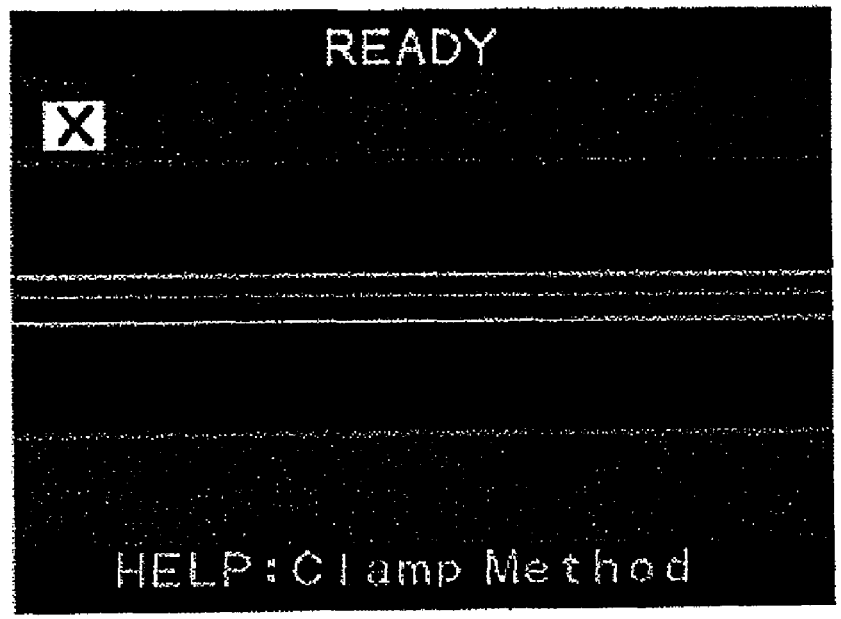
FIG. 5 is an image of a bend-optimized fiber that is placed in a splicer according to another exemplary embodiment of the present invention.
Figure 6:
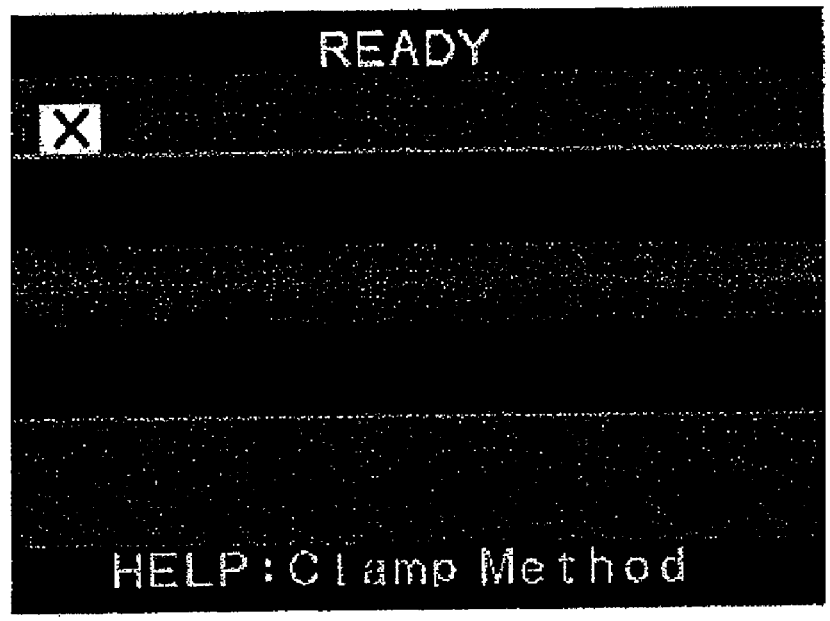
FIG. 6 is an image of the bend-optimized fiber of FIG. 5 after being heated by an arc discharge.
Figure 7:
FIG. 7 is an image of the bend-optimized fiber of FIG. 6 after being cleaved within the heated area of the fiber.

In another exemplary embodiment of the present invention, a bend-optimized optical fiber is stripped and loaded into the splicer without being cleaved. The image of FIG. 5 shows that the core of the fiber is not visible at this time. The fiber is then arc swept to collapse the mesh of nanometer-scale pockets in the fiber cladding. For example, a 20-bit arc may be swept over 2.5 mm of the fiber at a sweeping speed of about 10 µm/sec. As shown in FIG. 6, the fiber core becomes clearly visible in the cold fiber image. The fiber is then cleaved within the heat-treated area, as shown in FIG. 7, which results in a flat end surface with sharp corners. After the fiber has cooled, the fiber is then spliced together with another fiber by the PAS method.

A splicer with a PAS system can be programmed to automatically recognize a bend-optimized optical fiber. When a bend-optimized optical fiber is identified, a stronger cleaning arc and off-center positioning can be automatically applied before the fiber is aligned and spliced. A splicer with this function could be well deployed with the bend-optimized optical fiber for the FTTH market.

While the present invention has been particularly shown and described with reference to exemplary embodiments thereof, it will be understood by those of ordinary skill in the art that various changes in form and detail may be made therein without departing from the spirit and scope of the present invention as defined by the following claims and their legal equivalents.

What is claimed is:

1. A method of splicing a bend-optimized optical fiber having a cladding with a mesh of nanometer-scale pockets, the method comprising:
   cleaving the bend-optimized optical fiber;
   heating a section of the bend-optimized optical fiber at a distance from an end of the bend-optimized optical fiber until the mesh of nanometer-scale pockets in the cladding collapses;
   allowing the bend-optimized optical fiber to cool;
   transmitting light through the bend-optimized optical fiber; and
   splicing the bend-optimized optical fiber by analyzing an image of the bend-optimized optical fiber.

2. The method according to claim 1, wherein the distance from the end of the bend-optimized optical fiber is at least 200 µm.

3. The method according to claim 1, wherein the bend-optimized optical fiber is heated by an arc discharge with a current between about 11 mamp and about 13 mamp.

4. A method of splicing a bend-optimized optical fiber having a cladding with a mesh of nanometer-scale pockets, the method comprising:
   heating a section of the bend-optimized optical fiber until the mesh of nanometer-scale pockets in the cladding collapses;
   allowing the bend-optimized optical fiber to cool;
   cleaving the bend-optimized optical fiber through the section of the bend-optimized optical fiber that was heated;
   transmitting light through the bend-optimized optical fiber; and
   splicing the bend-optimized optical fiber by analyzing an image of the bend-optimized optical fiber.

5. The method according to claim 4, wherein the arc discharge has a current between about 11 mamp and about 13 mamp.

6. The method according to claim 4, wherein the heating the section includes sweeping an arc discharge over the section of the bend-optimized optical fiber.

7. The method according to claim 6, wherein the sweeping includes sweeping the arc discharge over the section at a sweeping speed of about 10 µm/sec.

* * * * *